United States Patent Office 3,487,546
Patented Jan. 6, 1970

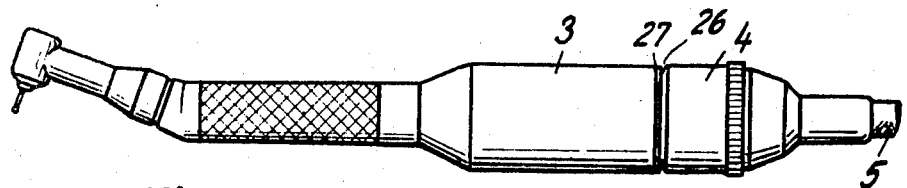
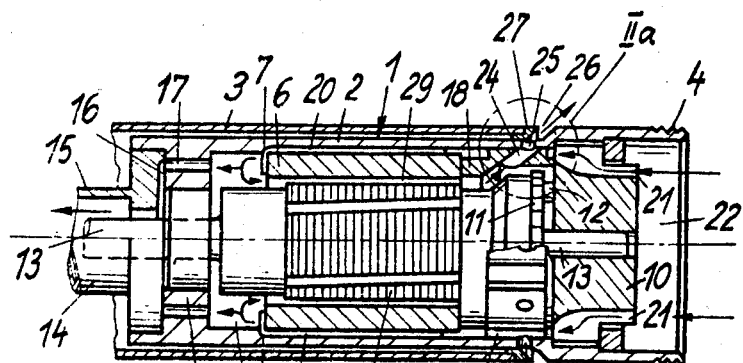
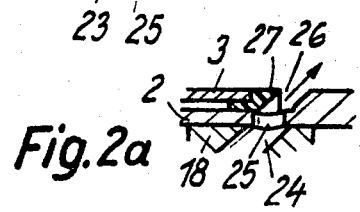
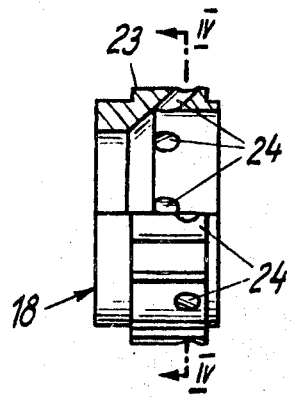
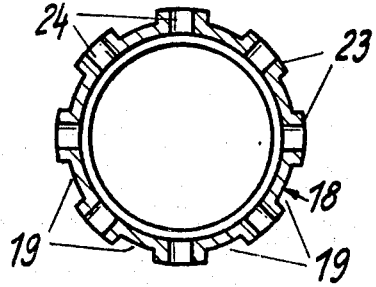

3,487,546
HAND DRILL FOR DENTISTS
Rainer Beierlein, Nuremberg, and Otto Fleer, Erlangen, Germany, assignors to Siemens Aktiengesellschaft, Erlangen, Germany, a firm of Germany
Filed May 16, 1968, Ser. No. 729,583
Claims priority, application Germany, May 20, 1967, 1,566,265
Int. Cl. A61c 1/08
U.S. Cl. 32—26                                                4 Claims

ABSTRACT OF THE DISCLOSURE

A hand drill for dentists of the type having an attached small electric motor which has an air gap between its rotor and its stator having the shape of a hollow cylinder; the motor has at least one other air gap between its stator and the cylindrically shaped motor casing, and an air space at the front end of the motor which interconnects the two air gaps. A compressed air conduit is airtightly connected with the rear end of the motor. Compressed air is introduced by a conduit inserted into the motor casing at the rear end of the motor and flows through one of the air gaps into the air space, whereupon it is returned through the other air gap to at least one outflow opening provided in the motor casing at the rear end of the motor. The hand drill of the present invention is particularly characterized in that the conduit introducing compressed air is substantially cylindrical and has a front surface airtightly engaging the rear surface of the stator and an outer surface airtightly engaging the inner surface of the motor casing; at least one opening provided in this outer surface at the entry of the outflow opening, extends into the air gap between the rotor and the stator; this outer surface which engages the inner surface of the motor casing has at least one air channel extending from the entry of the compressed air conduit into the air gap between the stator and the motor casing.

---

This invention relates to a hand drill for dentists.

Hand drills for dentists which are known in prior art are provided with an electric motor driving the drilling tool and directly coupled with the handle. The electric motor is of very small size so as not to increase the size of the handle, and it is cooled by compressed air.

In one of the known drills, compressed air flows from a compressed air conduit attached to the rear end of the motor into the air gap between the rotor and the stator and escapes from the rotor chamber through outflow openings provided in the front end of the motor directed toward the handle. In this drill the motor casing is comparatively highly heated, since the temperature of compressed air flowing through the air gap between the rotor and the stator, particularly close to the front end of the motor, is relatively quite high. Furthermore, the escaping flow of compressed air which contains dirt particles, particularly coal rubbings, hits with full strength the hand of the dentists, produces skin irritations and interferes with his work.

Another driving device for a dental drill cooled with compressed air and known in prior art, includes an electric motor having an air gap between the stator and the motor casing through which compressed air flows from the front end of the motor to outlet openings provided at the rear end of the motor. This construction is intended to diminish heat transmission from the stator to the motor casing and thence to the hand of the user. Since in this construction no compressed air flows through the rotor chamber and the developed heat is radiated to a large extent in the rotor chamber, the temperature in the rotor chamber can rise to an inadmissibly high extent when the motor is overloaded. Furthermore, the compressed air conduit connected with the handle at the front end of the motor close to the coupling location of the drive, greatly interferes with the work of the dentist.

Finally, a handle drill of the above-described type is known, wherein air gaps are provided between the rotor and the stator and between the stator and the motor casing. These air gaps are interconnected by an air space at the front end of the motor. Compressed air which is supplied to the handle by a compressed air conduit connected at the rear end of the motor, is then blown through a nozzle into the air gap between the stator and the rotor, is guided into an air space provided in the front end of the motor and then flows through the air gap between the stator and the motor casing to outflow openings provided in the motor casing, partly at the rear end of the motor. Since compressed air flowing along the inner side of the motor casing has already acquired a substantial amount of heat in the air gap between the rotor and the stator, the motor casing is heated comparatively strongly in this known drill construction as well.

An object of the present invention is the provision of a hand drill with a coupled small electric motor cooled by compressed air wherein no inconvenient overheating of the motor casing will take place when the motor is overloaded and wherein the dentist is not disturbed in his work by compressed air flowing out of the compressed air conduit.

Other objects of the present invention will become apparent in the course of the following specification.

The hand drill of the present invention belongs to the type of hand drills with a coupled small electric motor having an air gap between the rotor and the stator which has the shape of a hollow cylinder. There is at least one other air gap between the stator and the motor casing as well as an air space at the front end of the motor which interconnects the two air gaps. A compressed air conduit is airtightly attached at the rear end of the motor, whereby compressed air is introduced into an air gap by an air conducting member inserted in the motor casing at the rear end of the motor, the compressed air being directed to the air space and being guided out of the other air gap to at least one outlet opening provided at the rear end of the motor in the cylindrically shaped casing. The present invention consists in that the substantially cylindrical, air conducting member engages airtightly with one of its front surfaces the rear surface of the stator and engages airtightly with its outer surface the inner surface of the motor casing. At least one bore hole is provided in the outer surface at the location of the entry of the outflow opening, the bore hole extending into the gap between the rotor and the stator. The air conducting member has at least one air channel separated from the bore hole and extending from the entry of the compressed air conduit into the gap between the stator and the motor casing.

In a hand drill of this construction compressed air flowing along the inner side of the motor casing is comparatively cold and compressed air flowing through the air gap between the rotor and the stator will cool directly the rotor and the inner surface of the stator. Thus only a comparatively small amount of heat is received from the compressed air in the air gap between the stator and the motor casing, so that no disturbing heating of the motor casing can take place. Furthermore, sufficient cooling is provided even if the motor is overcharged. The dentist is not disturbed in his work by the outflowing compressed air or by the compressed air hose, since compressed air flows out at the rear end of the motor and the compressed air hose is also attached to the rear end of the motor.

It is advisable to provide several bore holes, several air channels in the air conducting member and several outflow openings and to distribute them uniformly over the circumference of the air conducting member and the motor casing, respectively. Preferably, a part of the air conducting member can be a ring fixed in the motor casing at the rear end of the motor, which has a front surface airtightly engaging the rear end surface of the stator and which carries upon its circumference uniformly distributed, axially extending grooves which form air channels along with the inner surface of the motor casing, whereby the bore holes are located in the parts of the ring engaging the motor casing, namely, between the grooves. It is of advantage to mount the ring so that its other front surface airtightly engages a bearing constituting a further part of the air conducting member and in which the rotor shaft is airtightly mounted. Channels are provided in the bearing which connect the grooves with the compressed air conduit.

The invention will appear more clearly from the following detailed description when taken in connection with the accompanying drawing, showing by way of example, a preferred embodiment of the inventive idea.

In the drawing:

FIGURE 1 is a side view of a dental hand drill provided with a small electrical motor and constructed in accordance with the principles of the present invention.

FIGURE 2 is a longitudinal section through the motor of the drill of FIG. 1, some parts being shown in side view.

FIGURE 2a is an enlarged sectional view of the portion indicated by the circle IIa in FIG. 2.

FIGURE 3 is an enlarged side view, partly in section, of a part illustrated in FIG. 2.

FIGURE 4 is a section along the line IV—IV of FIG. 3.

The dental hand drill shown in FIG. 1 has a rear wider portion containing a small electric motor 1 which is shown in section in FIG. 2. A sleeve 3 shown in FIGS. 1 and 2 and constituting a handle, fits over the motor casing 2. There is a small air gap between the casing 2 and the sleeve 3 which is fixed to the handle. This air gap serves for heat insulation. The rear portion 4 of the motor casing 2 is adapted to the size of the outer diameter of the sleeve 3. A hose 5 used for conducting compressed air to the motor 5, is attached to the casing portion 4. The hose 5 also contains conduits for supplying electrical current to the motor 1. A hollow cylindrical, permanent magnet 6 is located in the casing 2 of the motor 1 and constitutes its stator, being held by angular pieces 7 connected with the casing 2 and the stator 6. The rotor 8 of the motor 1 has a shaft 13 supported in a bearing plate 9 constituting a part of the casing 2. The rotor 8 is also supported airtightly in a bearing member 10 inserted into the rear portion 4 of the casing 2. Carbons 12 are guided in the bearing member 10 and resiliently engage a disc-shaped commutator 11. The rotor shaft 13 extends through the bearing plate 9 and through a hollow cylindrical shoulder 14 of a coupling piece 15 inserted into the casing 2. The shaft 13 is connected within the handle with the parts actuating the drill tool. A gap located between the rotor shaft 13 and the inner wall of the shoulder 14, is connected with the rotor chamber through channels 16 in the coupling piece 15 and through channels 17 in the bearing plate 9 which are aligned with the channels 16.

A ring 18 is located between the permanent magnet 6 and the bearing body 10. Its side surfaces engage airtightly the magnet 6 and the bearing member 10 while its outer surfaces engage airtightly the motor casing 2. As shown in FIGS. 3 and 4, the outer surfaces of the ring 18 are provided with grooves 19 connecting air gaps 20 between the permanent magnet 6 and the motor casing 2 which are left open by the angle pieces 7, with channels 21 provided in the bearing member 10. The channels 21 open into a space 22 which is airtightly limited by the bearing member 10 with respect to the rotor space at the rear end of the motor. The hose 5 opens into the space 22. Portions 23 of the ring 18 which lie against the motor casing 2, are provided with inclined bore holes 24 which opens into the rotor chamber and are in alignment with corresponding outlet openings 25 in the motor casing 2 (FIG. 2a). Exhaust air can escape out of the outlet openings 25 through a gap 26 provided between a ring 27 made of insulating material and mounted upon the motor casing 2, and the rear end 4 of the motor casing 2. The ring 27 serves for centering the sleeve 3 and protects the sleeve 3 from being contacted by the hot exhaust flow and thus heated.

As shown in FIG. 2, compressed air which is still cold flows in the direction of the arrow out of the hose 5, through the channels 21, the grooves 19 and the air gaps 20 between the permanent magnet 6 and the motor casing 2 up to the air space 28 provided at the front end of the motor, and is deviated there to a large extent. Compressed air deviated into the air space 28 flows through the air gap between the rotor 8 and the permanent magnet 6, absorbs the heat which is to be removed therefrom and escapes out of the air gap 29 into the atmosphere through the bore holes 24, the outlet openings 25 and the gap 26. The exhaust air flow, when passing through the bore holes 24, thus intersects the inflowing current flowing through the grooves 19 without there being any intermixing of the two cool air currents. Since compressed air flowing through the air gaps 20 is still cool, the temperature of the motor casing 2 and of the sleeve 3 remains so low that the dentist, when working with the drill, will not be disturbed by any excessive temperatures of the part which he holds in his hand. The exhaust air flows out so far behind the motor that the work of the dentist is not interfered with.

A small part of compressed air flows out of the air space 28 through the channels 17 and 16 and the shoulder 14 of the coupling piece 15 into the interior of the handle and maintains overpressure there during the drilling, thereby preventing the penetration of dust particles resulting from the drilling, water, etc., through the connecting parts of the drill into the interior of the handle.

It is apparent that the example described above has been given solely by way of illustration and not by way of limitation and that it is subject to many variations and modifications within the scope of the present invention. All such variations and modifications are to be included within the scope of the present invention.

What is claimed is:

1. In a hand drill for dentists, in combination, a handle, a motor having a casing within said handle, said casing having a rear portion constituting a continuation of said handle, a stator within said motor casing, an air gap being provided between said stator and said motor casing, and a rotor enclosed by said stator, an air gap being provided between said stator and said rotor; a cylindrical air conducting member having an end surface airtightly engaging a rear surface of said stator and having a circumferential surface airtightly engaging an inner surface of said motor casing, said rear portion of the motor casing having an outflow opening formed therein, said member having at least one bore hole communicating with said outflow opening and with the air gap between said stator and said rotor, and a compressed air hose having an inlet connected with the rear portion of the motor casing, said circumferential surface of said member having at least one air channel communicating with the inlet of said hose and with the air gap between said stator and said motor casing.

2. A hand drill in accordance with claim 1, comprising a plurality of outflow openings uniformly distributed over the circumference of said motor casing and a plurality of bore holes and air channels uniformly distributed over the circumference of said member.

3. A hand drill in accordance with claim 2, wherein said member comprise a ring having a portion engaging an inner surface of said motor casing at the rear end of the motor and having an end surface airtightly engaging an end surface of the stator, the air channels of said member comprising axially extending, uniformly distributed grooves formed upon the circumference of said ring, said grooves along with the inner surface of said motor casing forming said air channels, the bore holes of said member extending along said portion of the ring.

4. A hand drill in accordance with claim 3, wherein said member comprises a bearing, said rotor having a shaft airtightly supported in said bearing, said ring having another end surface airtightly engaging a surface of said bearing, the air channels of said member connecting the grooves of said ring with said hose.

References Cited

UNITED STATES PATENTS 2,053,056  9/1936  Whiteside _____ 32—26 XR
3,427,720  2/1969  Berman et al. _____ 32—27

ROBERT PESHOCK, Primary Examiner